Patented July 18, 1950

2,515,207

UNITED STATES PATENT OFFICE 2,515,207

DRILLING MUD CLAY

Henry B. Fisher, Bartlesville, Okla., assignor to Phillips Petroleum Company, a corporation of Delaware No Drawing. Application January 5, 1948, Serial No. 650

5 Claims. (Cl. 252—8.5)

This invention relates to water base drilling muds. In a more specific aspect, it relates to a method of controlling viscosity of mud in wells. In another specific aspect, it relates to a method for treating bentonite for use in drilling muds. In another specific aspect, it relates to a method of drilling and controlling wells.

In the art of drilling wells, especially by the rotary method, it is necessary to use a drilling mud, as is well understood in the art. The drilling mud lubricates the drill stem, carries the cuttings to the surface of the well, and forms a filter cake on the walls of the well preventing the loss of at least any substantial amount of water from the drilling mud to the formations penetrated. In order to perform these important functions properly, the drilling mud should have a suitable viscosity, thixotropy and other properties at all times, in spite of adverse conditions encountered in the drilling.

Water base drilling muds having desirable properties contain various ingredients such as kaolin clay, bentonite clay, and colloidal suspending agents such as soluble cellulose derivatives. The kaolin helps give the mud the desired viscosity that is required for carrying the drill cuttings to the surface. The bentonite is used to impart the desirable colloidal and thixotropic properties for keeping the mud suspended in a colloidal state.

In usual drilling operations, it is the practice to maintain the pH above 8 and preferably between 9 and 10. A high pH inhibits corrosion of the drilling equipment and maintains a low concentration of the soluble calcium compounds which, in turn, is desirable for maintaing a low water loss and a more stable colloidal mud. During the drilling, when the pH drops below the desired value, the usual practice is to add caustic soda to raise the pH. When caustic soda is added to a drilling mud containing natural bentonite, there results an undesired increase in the viscosity of the mud.

When natural bentonite is added to a mud system, there usually results a rise in viscosity which is controlled by the addition of caustic soda and quebracho.

I have discovered that bentonite may be treated so that it does not cause an undue viscosity rise when it is added to the mud, nor does a viscosity rise result when caustic is added to a drilling mud containing bentonite so treated.

It is an object of this invention to provide an improved method of drilling wells.

It is another object of this invention to provide an improved well drilling mud.

Another object is to provide an improved method of preparing colloidal clay suspensions.

Another object is to provide a method of treating bentonite for use in a drilling mud to make it resistant to attack by caustic.

Numerous other objects and advantages of my invention will be apparent to those skilled in the art upon reading the following specification and claims.

Operations

In drilling a well by the rotary method, the usual practice is to use plain water as a drilling fluid at the outset. As the drilling proceeds, the finely divided particles of the formations penetrated are picked up by the drilling fluid. The particles of colloidal size that are not removed by the shale shaker or by settling in the mud pit are recirculated through the well. However, when greater depths are reached, it becomes necessary to increase the viscosity and thixotropy of the mud so that cuttings will be carried to the surface. This is usually done by the addition of kaolin clay and bentonite.

When ordinary bentonite is added to drilling fluid, there usually results a sharp, undesirable increase in the viscosity of the mud so that the rate of circulation is reduced, thereby reducing the capacity for carrying away cuttings which increase the danger that the drill string will be seized and twisted off. This undesired increase in the viscosity of the mud upon the addition of bentonite is ordinarily prevented by the addition of caustic soda and quebracho along with the bentonite. This means that when using ordinary bentonite, it is necessary to have on hand a large quantity of caustic soda and quebracho. There is one danger that the addition of caustic and quebracho will not be made at the proper time and in the proper amount and that the viscosity in the bore hole will rise before the inhibiting caustic and quebracho have had a chance to become thoroughly incorporated into the mud.

During drilling, it is also desirable to maintain the pH of the drilling fluid above 8 and preferably between 9 and 10. A high pH inhibits the corrosion of the drilling equipment and also maintains a low concentration of soluble calcium ions, which is desired in order that the proper water loss properties may be maintained. The maintaining of a high pH is ordinarily accomplished by the addition of small amounts of caustic soda to the drilling mud as required. If caustic is added to a drilling mud containing ordinary bentonite the viscosity of the mud will rise unless quebracho is also added.

In practicing my invention, I treat the bentonite before it is added to the drilling mud so that it is made resistant to attack by alkali. It may then be added to any drilling mud without producing a rise in viscosity. Also, the addition of caustic soda to a drilling mud containing my treated bentonite does not produce any rise in viscosity. When using my treated bentonite in a drilling fluid, it is not necessary to maintain a large stock of caustic soda on hand, since the only caustic soda necessary will be a small amount that is used for adjusting the pH of the drilling mud. It is not necessary to use caustic and quebracho upon adding my bentonite to a drilling mud.

My treatment comprises dispersing the bentonite in an aqueous solution of caustic alkali and heating the mixture to a temperature not exceeding 200° centigrade and maintaining this temperature for a required length of time and afterwards, draining and drying the bentonite.

In this treatment, I prefer to use a caustic soda solution having a concentration of 0.25 to 10 weight per cent. Other alkali metal hydroxides may be substituted for caustic soda. I prefer to heat the bentonite to a temperature between 95 and 100° centigrade. Temperatures as high as 200° centigrade may be employed but in such cases of higher temperature it is necessary to have the bentonite-caustic dispersion in a closed vessel to prevent evaporation of the water. I prefer to maintain the mixture at the desired tmperature for a period of time ranging from one-half to twenty-four hours. The length of heating bears an inverse relationship to the concentration of caustic and the temperature. Some beneficial effect may be obtained with a shorter period of heating. A longer period does not have any detrimental effect but the slight increase in beneficial effect does not justify the cost.

After the bentonite-caustic dispersion has been heated for the required length of time, the excess water is drained off and the bentonite dried. The method and temperature of drying are not critical as long as sintering does not occur. While it is not necessary to treat the bentonite further, the better practice would require that the treated bentonite be disintegrated before packaging for shipment to the field.

My invention will be more completely understood by reference to the following examples which demonstrate the advantages of my treated bentonite.

EXAMPLE I

A sample was prepared by making a 4.8 per cent suspension of bentonite in a caustic soda solution of about 0.6 weight per cent caustic content. This was maintained at a temperature of 95 C. for 24 hours. The excess water was then drained off and the bentonite was dried.

EXAMPLE II

Samples of a 4.8 per cent suspension of untreated bentonite were tested (API code 29) with and without added caustic soda with the following results:

Table I

| NaOH, lbs./bbl. | Viscosity, C. P. S. | Init. Gel, gms. | 10 Min. Gel, gms. | Water Loss ml./30 min. | pH |
|---|---|---|---|---|---|
| 0 | 17.5 | 0 | 7 | 11.7 | 8.0 |
| 2.5 | >100 | >100 | >100 | 12.8 | 12.0 |

The viscosity and gel strengths shown as >100 were too high to test by the methods used, which only allow tests up to 100.

EXAMPLE III

Samples of a 4.8 per cent suspension of the treated bentonite from Example I were tested with and without caustic as in Example II with the following results:

Table II

| NaOH, lbs./bbl. | Viscosity, C. P. S. | Init. Gel, gms. | 10 Min. Gel, gms. | Water Loss ml./30 min. | pH |
|---|---|---|---|---|---|
| 0 | 3.0 | 0 | 0 | 16.0 | 10.4 |
| 2.5 | 1.5 | 0 | 10 | 11.0 | 12.4 |

While I have described a preferred embodiment of my invention and one which has special advantages, other caustic alkali salts may be used instead of caustic soda. It is to be understood that any theory of operation advanced herein is not presented as being the only or necessary one but has been advanced merely to facilitate the disclosure. It is understood that this invention is not limited to any theory or operation or action. Various obvious changes may be made by those skilled in the art without departing from the spirit of this invention or from its scope as described in the following claims.

I claim:

1. The method of treating bentonite to stabilize its effect on the viscosity of water base well drilling mud which comprises dispersing said bentonite in an alkali metal hydroxide solution having an alkali concentration of 0.25 to 10 weight per cent, and heating the solution to between 95° C. and 200° C. for a minimum time of 24 hours for 95° C. and 0.25 weight per cent caustic and one-half hour for 200° C. and 10 weight per cent caustic, and with a proportional minimum time for intermediate temperatures and caustic concentrations.

2. The process of claim 1 in which the bentonite is separated from the solution and dried.

3. The process of claim 1 in which the bentonite is separated from the solution, dried, and disintegrated.

4. An aqueous bentonite slurry suitable for use in water base well drilling mud comprising water and bentonite which has been dispersed in an alkali metal hydroxide solution having an alkali concentration of 0.25 to 10 weight per cent and heated in solution to between 95° C. and 200° C. for a minimum time of 24 hours for 95° C. and 0.25 weight per cent caustic and one-half hour for 200° C. and 10 weight per cent caustic, and with a proportional minimum time for intermediate temperatures and caustic concentrations.

5. A dried bentonite suitable for use as a dispersion in water base well drilling mud comprising bentonite which has been dispersed in an alkali metal hydroxide solution having an alkali concentration of 0.25 to 10 weight per cent heated in solution to between 95° C. and 200° C. for a minimum time of 24 hours for 95° C. and 0.25 weight per cent caustic and one-half hour for 200° C. and 10 weight per cent caustic, and with a proportional minimum time for intermediate temperatures and caustic concentrations, and dried.

HENRY B. FISHER.

(References on following page)

REFERENCES CITED

The following references are of record in the file of this patent:

UNITED STATES PATENTS

| Number | Name | Date |
|---|---|---|
| 1,555,640 | Day | Sept. 29, 1925 |
| 2,109,858 | Cross et al. | Mar. 1, 1938 |
| 2,133,759 | Vail et al. | Oct. 18, 1938 |
| 2,320,622 | Lindsey | June 1, 1943 |
| 2,363,876 | La Lande | Nov. 28, 1944 |
| 2,393,273 | Wayne | Jan. 22, 1946 |

FOREIGN PATENTS

| Number | Country | Date |
|---|---|---|
| 458,240 | Great Britain | Dec. 15, 1936 |

OTHER REFERENCES

Reducing the Viscosity of Mud Flush, article in The Petroleum Times, March 3, 1934, page 225.